(12) United States Patent
Tanaka

(10) Patent No.: US 11,790,788 B2
(45) Date of Patent: Oct. 17, 2023

(54) INFORMATION PROCESSING APPARATUS AND INFORMATION PROCESSING METHOD

(71) Applicant: KDDI CORPORATION, Tokyo (JP)

(72) Inventor: Takaya Tanaka, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 101 days.

(21) Appl. No.: 17/410,539

(22) Filed: Aug. 24, 2021

(65) Prior Publication Data

US 2022/0238028 A1    Jul. 28, 2022

(30) Foreign Application Priority Data

Jan. 26, 2021    (JP) .................................. 2021-010329

(51) Int. Cl.
| | |
|---|---|
| *G08G 5/00* | (2006.01) |
| *B60L 50/60* | (2019.01) |
| *B64C 39/02* | (2023.01) |
| *B64D 27/24* | (2006.01) |
| *B64U 10/13* | (2023.01) |
| *B64U 50/19* | (2023.01) |

(52) U.S. Cl.
CPC ............ *G08G 5/0026* (2013.01); *B60L 50/60* (2019.02); *B64C 39/024* (2013.01); *B64D 27/24* (2013.01); *G08G 5/003* (2013.01); *G08G 5/0013* (2013.01); *B60L 2200/10* (2013.01); *B64U 10/13* (2023.01); *B64U 50/19* (2023.01); *B64U 2201/10* (2023.01)

(58) Field of Classification Search
CPC .... G08G 5/0026; G08G 5/0013; G08G 5/003; B60L 50/60; B60L 2200/10; B64C 39/024; B64D 27/24; B64U 10/13; B64U 50/19; B64U 2201/10
See application file for complete search history.

(56) References Cited

U.S. PATENT DOCUMENTS

2020/0317335 A1    10/2020    Sugaya

FOREIGN PATENT DOCUMENTS

| JP | 6241579 B1 | 12/2017 |
|---|---|---|
| JP | 2020-004200 A | 1/2020 |

(Continued)

OTHER PUBLICATIONS

Office Action issued in corresponding Japanese Patent Application No. 2021-010329 dated Apr. 27, 2021 with English translation.

*Primary Examiner* — Curtis A Kuntz
*Assistant Examiner* — James E Munion
(74) *Attorney, Agent, or Firm* — Foley & Lardner LLP

(57) ABSTRACT

An information processing apparatus includes a flight information acquisition unit that acquires a flight path on which a flight device operating by electric battery power supplied from a battery is scheduled to fly, a radio wave information acquisition unit that acquires radio wave information including the intensity of a radio wave used for communication by the flight device within a predetermined range based on the flight path, and a decision unit that decides a candidate charging facility in which the battery is chargeable, as a charging facility used for charging the battery by the flight device based on the intensity in at least one of a region including the candidate charging facility and a region between the flight path and the candidate charging facility.

9 Claims, 6 Drawing Sheets

(56) References Cited

FOREIGN PATENT DOCUMENTS

| JP | 2020004200 A | * | 1/2020 | |
|----|----|----|----|----|
| JP | 6914164 B2 | * | 8/2021 | |
| WO | WO-2017099070 A1 | * | 6/2017 | ............ B64C 27/08 |
| WO | WO-2018/198313 A1 | | 11/2018 | |
| WO | WO-2020153316 A1 | * | 7/2020 | |

* cited by examiner

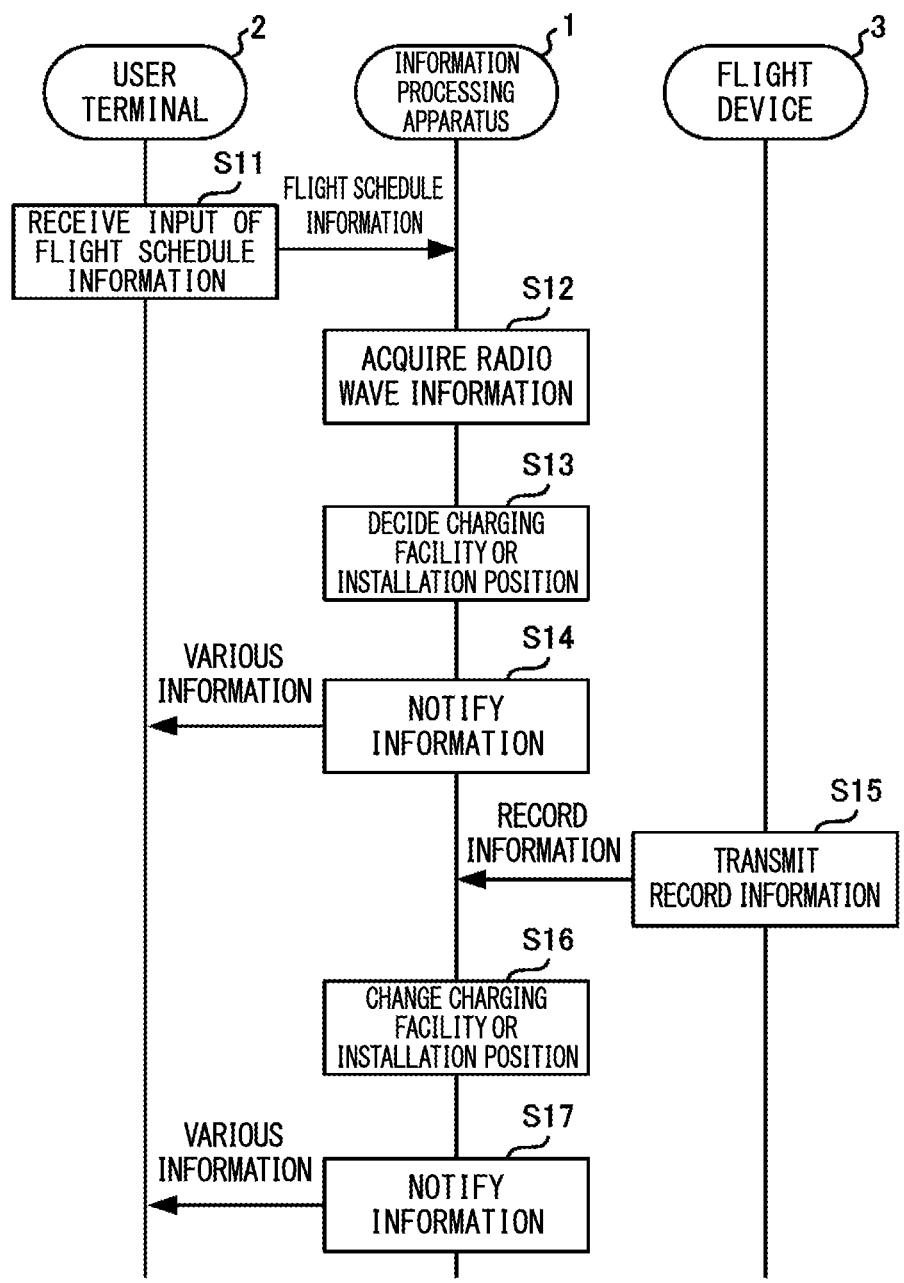

INFORMATION PROCESSING APPARATUS AND INFORMATION PROCESSING METHOD

BACKGROUND OF THE INVENTION

Field of the Invention

The present invention relates to an information processing apparatus and an information processing method for deciding arrangement of a charging facility in which a battery included in a flight device is charged.

Priority is claimed on Japanese Patent Application No. 2021-010329, filed Jan. 26, 2021, the content of which is incorporated herein by reference.

Description of Related Art

PCT International Publication No. WO2018/198313 discloses a system that receives an input of a flight area of a flight device such as a drone and the purpose of flight, creates a flight path in accordance with the received area and the purpose, and controls the flight of the flight device in accordance with the created flight path.

SUMMARY OF THE INVENTION

The flight device such as a drone includes a rechargeable battery, flies along the flight path using electric battery power supplied from a battery, and performs a predetermined task while transmitting and receiving various data to and from an outside by wireless communication. In order to prevent insufficiency of the remaining capacity of the battery, the flight device can charge the battery by flying to a charging facility such as a drone port at a certain point during flying along the flight path.

However, even in a case where the presence of wireless communication radio waves in the flight path are considered, the presence of such radio waves around the charging facility are not considered. Thus, the flight device may not be able to perform wireless communication when flying to the charging facility, and an adverse effect may occur on the predetermined task during the flight.

Therefore, the present invention is conceived in view of such issues, and an object thereof is to enable a flight device that can fly using electric battery power to perform stable wireless communication during charging the battery in a charging facility.

An information processing apparatus of a first aspect of the present invention includes a flight information acquisition unit that acquires the flight path on which a flight device operating by electric battery power supplied from a battery is scheduled to fly, a radio wave information acquisition unit that acquires radio wave information including an intensity of radio waves (hereinafter, simply referred to as "the intensity") used for communication by the flight device within a predetermined range based on the flight path, and a decision unit that decides a candidate charging facility in which the battery is chargeable, as a charging facility to be used for charging the battery by the flight device based on the intensity in at least one of a region including the candidate charging facility and a region between the flight path and the candidate charging facility.

In a case where the decision unit cannot decide the charging facility based on the intensity in at least one of the region including the candidate charging facility and the region between the flight path and the candidate charging facility, the decision unit may decide an installation position for newly installing the charging facility from a candidate region in which the charging facility is installable, based on the intensity in at least one of the candidate region and a region between the flight path and the candidate region.

The decision unit may decide the charging facility based on the intensity in a path on which the flight device flies from the flight path to the candidate charging facility.

In addition to the intensity, the decision unit may decide the charging facility based on at least one of a distance from the flight path to the candidate charging facility and characteristics of the flight device.

In addition to the intensity, the decision unit may decide the charging facility based on an environment in at least one of the region including the candidate charging facility and the region between the flight path and the candidate charging facility.

In addition to the intensity, the decision unit may decide the charging facility on a condition that the flight device is visually recognizable from a predetermined position while the flight device flies to the candidate charging facility.

In addition to the intensity, the decision unit may decide a first candidate charging facility for which a length of a path on which the flight device flies to the candidate charging facility is a first value as the charging facility, preferentially over a second candidate charging facility for which the length is a second value greater than the first value.

The flight information acquisition unit may acquire record information including at least one of a record time period taken upon flight of the flight device on the flight path and record intensity of the radio wave measured upon the flight of the flight device on the flight path, and the decision unit may decide the candidate charging facility different from the charging facility, as the charging facility based on the record information.

The information processing apparatus may further include a notification unit that notifies an information terminal associated with the flight device of a determination result as to whether or not the intensity in at least one of the region including the candidate charging facility and the region between the flight path and the candidate charging facility satisfies a condition for deciding the candidate charging facility as the charging facility.

An information processing method of a second aspect of the present invention includes, by the execution of a processor, acquiring a flight path on which a flight device operating by electric battery power is scheduled to fly, acquiring radio wave information including intensity of a radio wave used for communication by the flight device within a predetermined range based on the flight path, and deciding a candidate charging facility in which the battery is chargeable, as a charging facility to be used for charging the battery by the flight device based on the intensity in at least one of a region including the candidate charging facility and a region between the flight path and the candidate charging facility.

An information processing apparatus of a third aspect of the present invention includes a flight information acquisition unit that acquires a flight path on which a flight device operating by electric battery power supplied from a battery is scheduled to fly, a radio wave information acquisition unit that acquires radio wave information including intensity of a radio wave used for communication by the flight device within a predetermined range based on the flight path, and a decision unit that decides an installation position for newly installing a charging facility in which the battery is chargeable, from a candidate region in which the charging facility is installable, based on the intensity in at least one of the candidate region and a region between the flight path and the candidate region.

The decision unit may decide the installation position based on the intensity in a path on which the flight device flies from the flight path to the candidate region.

In addition to the intensity, the decision unit may decide the charging facility based on at least one of a distance from the flight path to the candidate region and characteristics of the flight device.

In addition to the intensity, the decision unit may decide the charging facility based on an environment in at least one of the candidate region and the region between the flight path and the candidate region.

An information processing method of a fourth aspect of the present invention includes, by the execution of a processor, acquiring a flight path on which a flight device operating by electric battery power supplied from a battery is scheduled to fly, acquiring radio wave information including the intensity of a radio wave used for communication by the flight device within a predetermined range based on the flight path, and deciding an installation position for newly installing a charging facility in which the battery is chargeable, from a candidate region in which the charging facility is installable, based on the intensity in at least one of the candidate region and a region between the flight path and the candidate region.

According to the present invention, an effect of enabling a flight device that flies using electric battery power supplied from a battery to perform stable wireless communication during charging the battery in a charging facility is achieved.

BRIEF DESCRIPTION OF THE DRAWINGS

FIG. 7 is a diagram illustrating a sequence of an information processing method executed by the information processing system.

DETAILED DESCRIPTION OF EMBODIMENTS

Summary of Information Processing System

Figure 1:
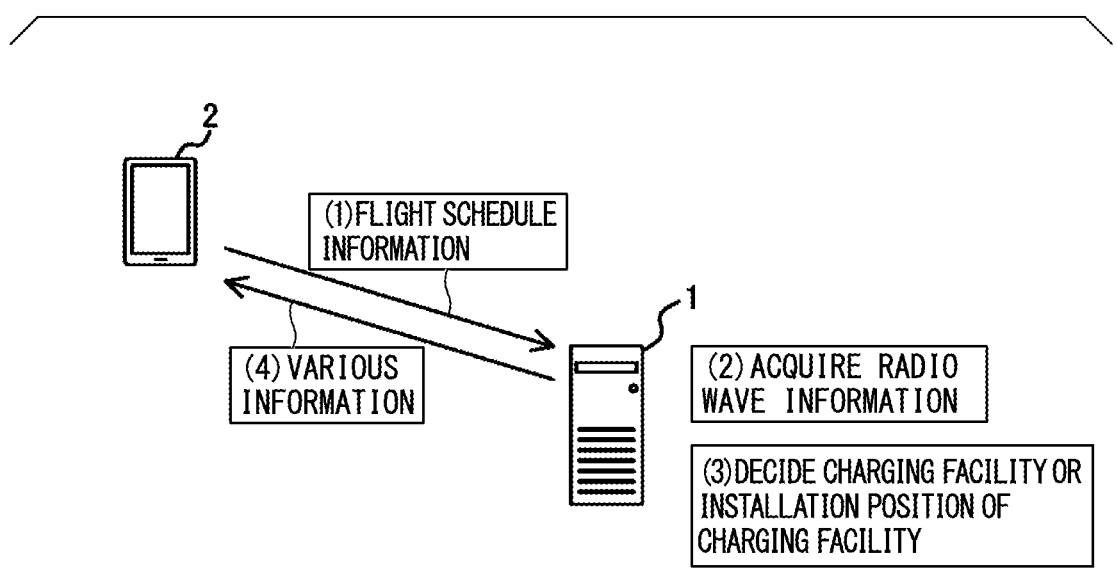
FIG. 1 is a schematic diagram of an information processing system according to an embodiment.
Figure 1:
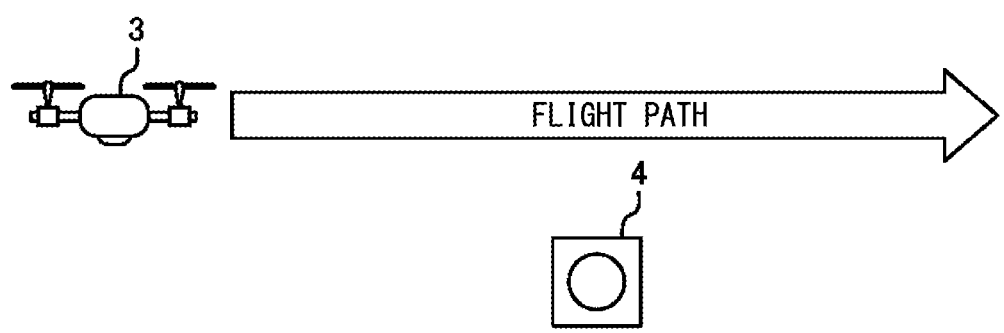

FIG. 1 is a schematic diagram of an information processing system according to the present embodiment. The information processing system includes an information processing apparatus 1, a user terminal 2, a flight device 3, and a charging facility 4. The information processing system may include other terminals, apparatuses, and the like.

The information processing apparatus 1 is a computer that decides the charging facility 4 to be used for charging a battery by the flight device 3 or an installation position for newly installing the charging facility 4 based on the intensity of radio waves around a flight path. The information processing apparatus 1 is a single apparatus or may be a plurality of apparatuses. In addition, the information processing apparatus 1 may be one or a plurality of virtual servers that operate on a cloud which is a set of computer resources.

The user terminal 2 is a computer used by a user. The user terminal 2 is an information terminal such as a smartphone, a tablet terminal, or a personal computer. The user is, for example, a person who operates, manages, or possesses the flight device 3. The user terminal 2 is associated with the flight device 3. The user terminal 2 includes a display unit such as a liquid crystal display for displaying information and an operation unit such as a touch panel for receiving an operation performed by the user. The user terminal 2 transmits and receives information to and from the information processing apparatus 1 by communication.

The flight device 3 is an unmanned flight device such as a drone that flies on a flight path designated by the user and performs a predetermined work. In addition, the flight device 3 may be a manned flight device such as an airplane or a flyable vehicle. The flight device 3 includes a rechargeable battery and operates using electric battery power supplied from the battery. The work performed by the flight device 3 is, for example, transport of an object while on the flight path, imaging around the flight path, release of an object (agrochemical or the like) while on the flight path, or output of information (voice, light, or the like) while on the flight path. The flight device 3 performs communication using a communication service provided by a communication carrier (referred to as a communication provider).

The charging facility 4 is a facility for charging the battery included in the flight device 3. The charging facility 4 is, for example, a drone port on which the drone which is the flight device 3 can take off and land. For example, the charging facility 4 charges the battery of the flight device 3 by connecting to the flight device 3 landed on the charging facility 4 and supplying electric power to the flight device 3.

Hereinafter, a summary of processing executed by the information processing apparatus 1 according to the present embodiment will be described. The information processing apparatus 1 receives flight schedule information including the flight path on which the flight device 3 is scheduled to fly, from the user terminal 2 ((1) in FIG. 1). The information processing apparatus 1 acquires radio wave information including the intensity of radio waves used for communication by the flight device 3 within a predetermined range based on the flight path included in the flight schedule information ((2) in FIG. 1).

The information processing apparatus 1 decides the charging facility 4 to be used for charging the battery by the flight device 3 or the installation position for newly installing the charging facility 4 based on the intensity of radio waves in a region related to the charging facility 4 or a candidate region in which the charging facility 4 can be installed ((3) in FIG. 1). The information processing apparatus 1 notifies the user terminal 2 of information indicating the decided charging facility 4 or the installation position and a determination result as to whether or not the intensity of the radio wave in the region related to the charging facility 4 satisfies a condition ((4) in FIG. 1).

In such a manner, the information processing apparatus 1 decides the charging facility 4 to be used for charging the battery by the flight device 3 or decides the installation position for newly installing the charging facility 4 based on the intensity of the radio wave in the region related to the charging facility 4 or the candidate region in which the charging facility 4 can be installed. Accordingly, the information processing apparatus 1 can enable the flight device 3 to perform stable wireless communication in a case of flying to the charging facility 4 and suppress occurrence of an adverse effect on the work of the flight device 3 during the flight due to deterioration of a communication situation.

Configuration of Information Processing Apparatus 1

Figure 2:
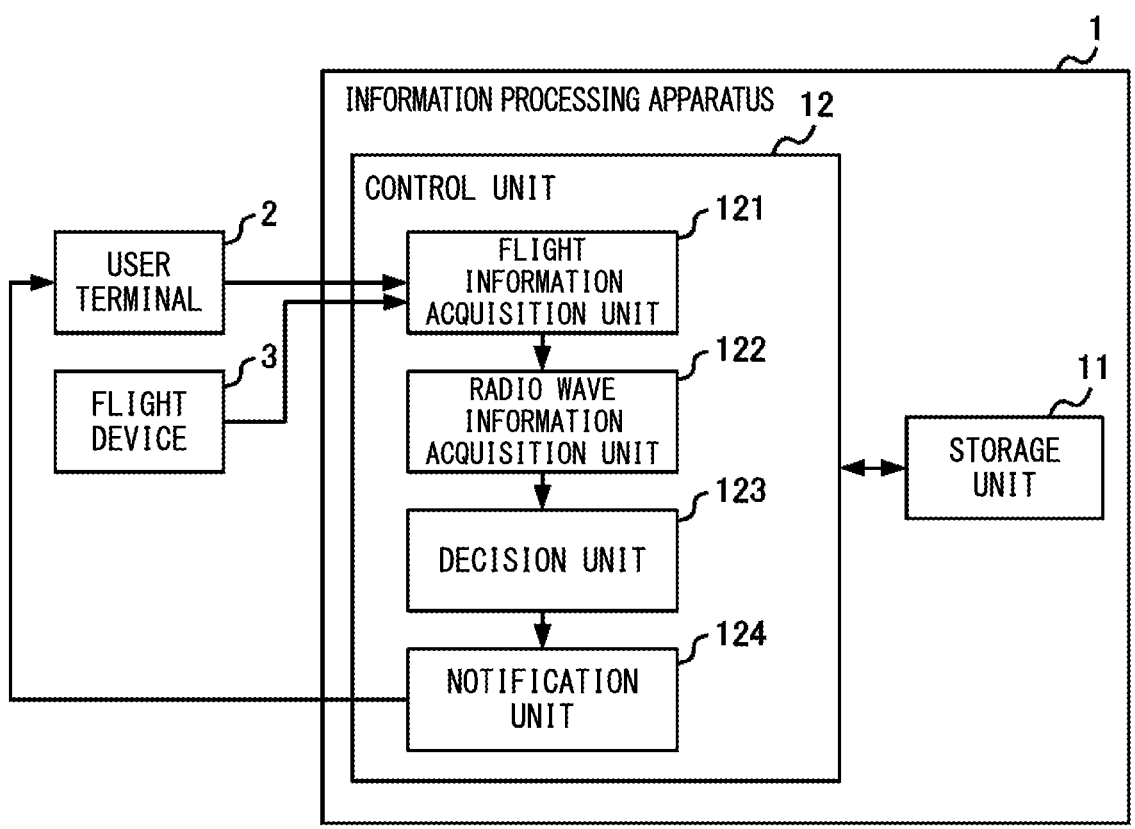
FIG. 2 is a block diagram of an information processing apparatus according to the embodiment.

FIG. 2 is a block diagram of the information processing apparatus 1 according to the present embodiment. In FIG. 2, arrows indicate a main flow of data, and a flow of data other than illustrated in FIG. 2 may be present. In FIG. 2, each block indicates a configuration in function units and does not indicate a configuration in hardware (device) units. Thus, the blocks illustrated in FIG. 2 may be implemented in a single apparatus or may be separately implemented in a plurality of apparatuses. Exchange of data between the blocks may be performed through any means such as a data bus, a network, or a portable storage medium.

The information processing apparatus 1 includes a storage unit 11 and a control unit 12. The storage unit 11 is a storage medium including a read only memory (ROM), a random access memory (RAM), a hard disk drive, and the like. The storage unit 11 stores, in advance, a program executed by the control unit 12. In addition, the storage unit 11 stores, in advance, the radio wave information including the intensity of the radio wave within the predetermined range based on the flight path included in the flight schedule information.

In addition, the storage unit 11 stores, in advance, charging facility information including positions of one or a plurality of charging facilities 4. In addition, the storage unit 11 stores, in advance, candidate region information that indicates a region in which the charging facility 4 can be installed. The candidate region information includes, for example, a range of coordinates or an address of a location (vacant land or the like) in which the charging facility 4 can be installed.

The control unit 12 includes a flight information acquisition unit 121, a radio wave information acquisition unit 122, a decision unit 123, and a notification unit 124. The control unit 12 is a processor such as a central processing unit (CPU) and functions as the flight information acquisition unit 121, the radio wave information acquisition unit 122, the decision unit 123, and the notification unit 124 by executing the program stored in the storage unit 11. Each unit of the control unit 12 may be separately implemented in the plurality of apparatuses constituting the information processing apparatus 1.

Hereinafter, a configuration for executing processing according to the present embodiment by the information processing apparatus 1 will be described. The flight information acquisition unit 121 receives the flight schedule information including the flight path on which the flight device 3 is scheduled to fly, from the user terminal 2.

Figure 3:
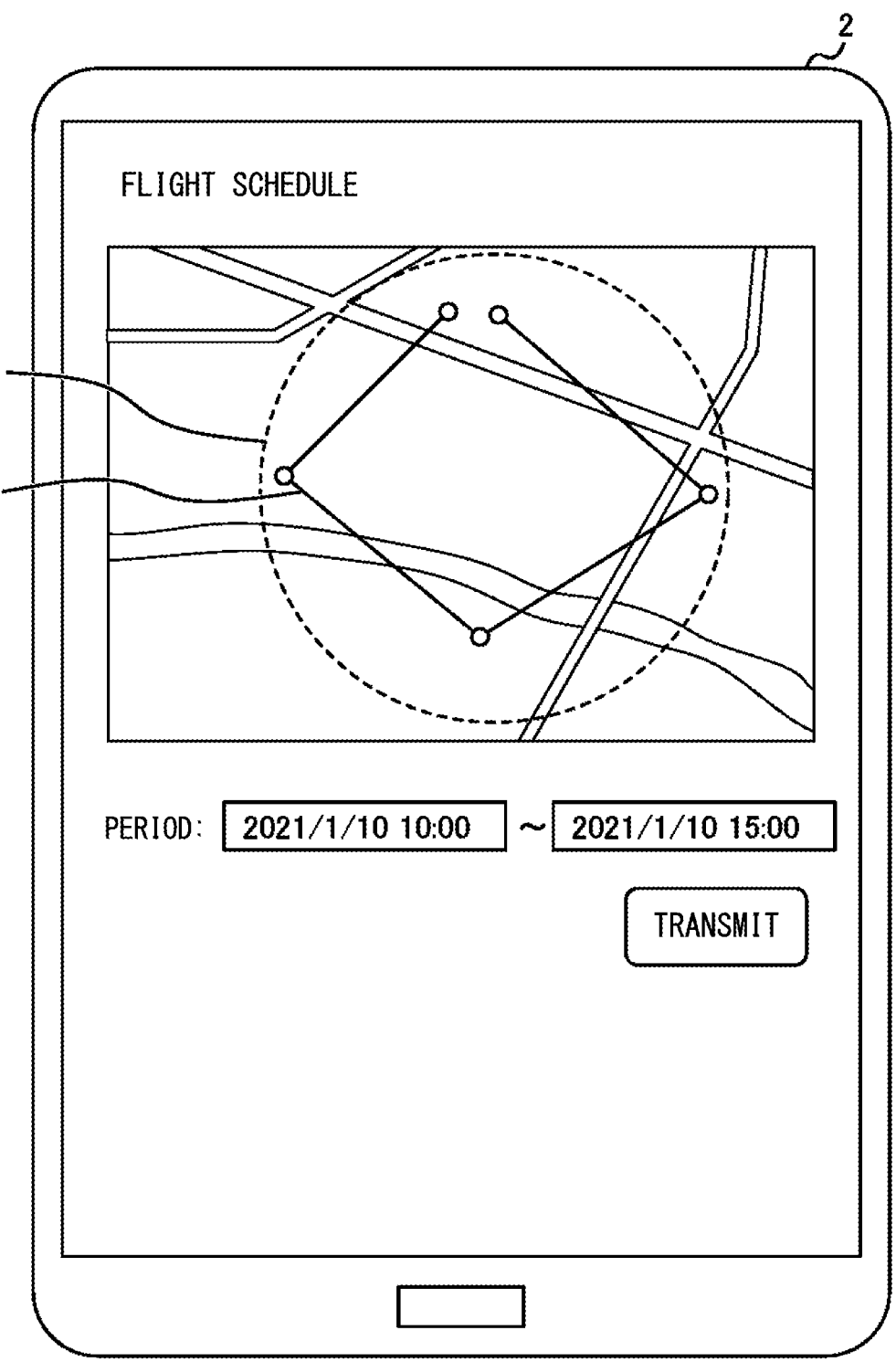
FIG. 3 is a schematic diagram of a flight schedule screen for receiving an input of flight schedule information in a user terminal.

FIG. 3 is a schematic diagram of a flight schedule screen for receiving an input of the flight schedule information in the user terminal 2. For example, the user terminal 2 receives a planar range (flight area) designated on a map displayed on the flight schedule screen as a flight range R. In addition, the user terminal 2 receives a linear path designated in the flight range R on the map displayed on the flight schedule screen as a flight path F. In addition, the user terminal 2 may receive a designation of the flight path F and does not receive a designation of the flight range R.

In addition, the user terminal 2 may receive a designation of a flight schedule period in which the flight device 3 flies. The flight schedule period is, for example, a period that is designated by a start date and time and an end date and time. In addition, the user terminal 2 may receive a designation of a work content to be performed on the flight path by the flight device 3. The work content is a type of work such as imaging, monitoring, or delivery to be performed by the flight device 3. The work content may be designated for the entire flight path or may be designated for each point in the flight path. The user terminal 2 may receive an input of other information.

In the information processing apparatus 1, the flight information acquisition unit 121 acquires the flight schedule information including the flight path from the user terminal 2 based on each information input on the flight schedule screen. The flight information acquisition unit 121 stores the flight schedule information received from the user terminal 2 in the storage unit 11.

The radio wave information acquisition unit 122 acquires the radio wave information, stored in advance in the storage unit 11, including the intensity of the radio wave used for communication by the flight device 3 within the predetermined range (for example, within 1 km from the flight path) based on the flight path. The radio waves used for communication by the flight device 3 are radio waves of a predetermined frequency band used in a communication standard such as 3rd Generation (3G), Long Term Evolution (LTE), or 5th Generation (5G). The intensity of the radio waves is represented by, for example, signal intensity or a signal-to-noise ratio (SNR).

The radio wave information includes, for example, a map that indicates the intensity of the radio wave actually measured or simulated at each point within the predetermined range based on the flight path. The radio wave information may indicate the intensity of the radio wave using other methods such as a list of intensity of radio waves for each coordinate or address.

The decision unit 123 decides the charging facility 4 to be used for charging the battery by the flight device 3 or decides the installation position for newly installing the charging facility 4 based on the radio wave information. Hereinafter, processing of deciding the charging facility 4 by the decision unit 123 and processing of deciding the installation position by the decision unit 123 will be described in order.

First, the processing of deciding the charging facility 4 by the decision unit 123 will be described. The decision unit 123, based on the charging facility information stored in advance in the storage unit 11, extracts the charging facility 4 that is already installed within the predetermined range (for example, within 1 km from the flight path) based on the flight path, as a candidate charging facility 4a that is a candidate for the charging facility 4 to be used for charging the battery by the flight device 3.

The decision unit 123 decides the candidate charging facility 4a as the charging facility 4 to be used for charging the battery by the flight device 3, based on the intensity of the radio waves in at least one of a region including the candidate charging facility 4a and a region between the flight path and the candidate charging facility 4a. Hereinafter, at least one of the region including the candidate charging facility 4a and the region between the flight path and the candidate charging facility 4a will be referred to as a region related to the candidate charging facility 4a.

For example, the decision unit 123 specifies the intensity in at least one of the region including the candidate charging facility 4a and the region between the flight path and the candidate charging facility 4a from the radio wave information acquired by the radio wave information acquisition unit 122. The decision unit 123 may decide the charging facility 4 using the intensity in both of the region including the candidate charging facility 4a and the region between the flight path and the candidate charging facility 4a, or may decide the charging facility 4 using the intensity in any one of the regions.

In a case where the specified intensity is greater than or equal to a predetermined reference value, the decision unit 123 decides the candidate charging facility 4a as the charging facility 4 to be used for charging the battery by the flight device 3. In a case where the specified intensity is less than the predetermined reference value, the decision unit 123 does not decide the candidate charging facility 4a as the charging facility 4 to be used for charging the battery by the flight device 3. Accordingly, the information processing apparatus 1 can decide the charging facility 4 to be used for charging the battery by the flight device 3 considering the intensity of the radio waves, and enable the flight device 3 to perform stable wireless communication in a case of flying to the charging facility 4.

Figure 4:
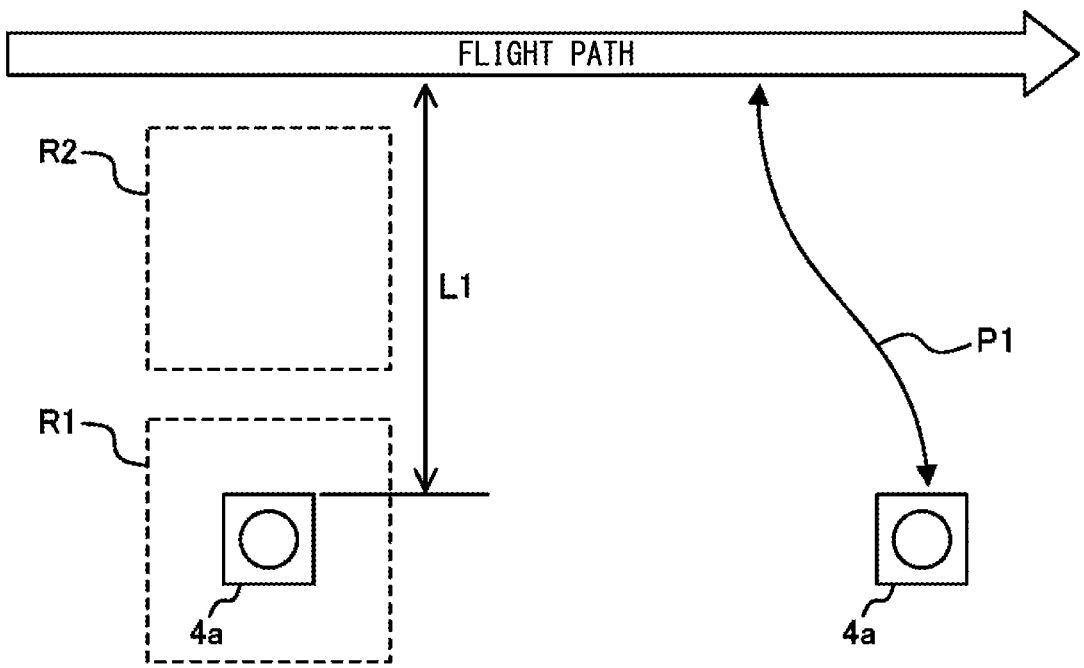
FIG. 4 is a schematic diagram for describing a method of deciding a charging facility by a decision unit.

FIG. 4 is a schematic diagram for describing a method of deciding the charging facility 4 by the decision unit 123. A region R1 including the candidate charging facility 4a and a region R2 between the flight path and the candidate charging facility 4a are represented in FIG. 4. The region R2 is, for example, a region including a straight linear (that is, the shortest distance) path from the flight path to the candidate charging facility 4a. The decision unit 123 specifies the intensity in at least one of the region R1 and the region R2 from the radio wave information acquired by the radio wave information acquisition unit 122. In a case where the intensity in at least one of the region R1 and the region R2 related to a certain candidate charging facility 4a is greater than or equal to the predetermined reference value, the decision unit 123 decides the candidate charging facility 4a as the charging facility 4 to be used for charging the battery by the flight device 3.

In addition, the decision unit 123 may decide the charging facility 4 based on the intensity in a path (path P1 in FIG. 4) on which the flight device 3 flies from the flight path to the candidate charging facility 4a in the region between the flight path and the candidate charging facility 4a. In this case, the decision unit 123 specifies a straight linear path between the flight path and the candidate charging facility 4a or a path from the flight path to the candidate charging facility 4a obtained by simulation. The decision unit 123 specifies the intensity on the specified path from the radio wave information acquired by the radio wave information acquisition unit 122.

In a case where the intensity in the path to a certain candidate charging facility 4a is greater than or equal to the predetermined reference value, the decision unit 123 decides the candidate charging facility 4a as the charging facility 4 to be used for charging the battery by the flight device 3. Accordingly, the information processing apparatus 1 can suppress an event in which the flight device 3 cannot perform wireless communication in a path for reaching the charging facility 4.

In addition to the intensity of the radio waves, the decision unit 123 may decide the charging facility 4 based on at least one of a distance (distance L1 in FIG. 4) from the flight path to the candidate charging facility 4a and characteristics of the flight device 3. In this case, the decision unit 123 specifies the characteristics of the flight device 3 based on aircraft information about the flight device 3 stored in advance in the storage unit 11. The characteristics of the flight device 3 are properties of an aircraft related to flight of the flight device 3, such as a flight speed, a weight, and a battery capacity. The decision unit 123 calculates an upper limit distance based on the characteristics of the flight device 3. The upper limit distance is, for example, a reachable distance of the flight device 3 that is calculated based on the flight speed, the weight, the battery capacity, and the like.

In a case where the intensity of the radio waves in the region related to a certain candidate charging facility 4a satisfies a predetermined radio wave condition, and the distance from the flight path to the candidate charging facility is less than or equal to the upper limit distance, the decision unit 123 decides the candidate charging facility 4a as the charging facility 4 to be used for charging the battery by the flight device 3. Accordingly, the information processing apparatus 1 can decide the charging facility 4 within a reachable range of the flight device 3 after considering the intensity of the radio waves.

In addition to the intensity of the radio waves, the decision unit 123 may decide the charging facility 4 based on an environment in at least one of the region including the candidate charging facility 4a and the region between the flight path and the candidate charging facility 4a. In this case, the decision unit 123 specifies the environment in the region related to the candidate charging facility 4a based on environment information stored in advance in the storage unit 11. For example, a condition of the environment is such that the number or size of obstacles such as buildings satisfies a predetermined condition, an index indicating a degree of interference of the radio waves satisfies a predetermined condition, an attribute indicating that flying cannot be performed is not set on a land, or a land owner satisfies a predetermined condition (public land or the like).

In a case where the intensity of the radio waves in the region related to a certain candidate charging facility 4a satisfies the predetermined radio wave condition, and the environment in the region related to the candidate charging facility 4a satisfies a predetermined condition, the decision unit 123 decides the candidate charging facility 4a as the charging facility 4 to be used for charging the battery by the flight device 3. Accordingly, the information processing apparatus 1 can decide the charging facility 4 of which a surrounding environment satisfies the predetermined condition, after considering the intensity of the radio waves.

In addition to the intensity of the radio waves, the decision unit 123 may decide the charging facility 4 on a condition that the flight device 3 is visually recognizable from a predetermined position while the flight device 3 flies to the candidate charging facility 4a. In this case, the decision unit 123 specifies the straight linear path between the flight path and the candidate charging facility 4a or the path from the flight path to the candidate charging facility 4a obtained by simulation. The decision unit 123, by simulation, determines whether or not the specified path is visually recognizable from the predetermined position (for example, a base where the user operates the flight device 3).

In a case where the intensity of the radio waves in the region related to a certain candidate charging facility 4a satisfies the predetermined radio wave condition, and it is determined that the flight device 3 is visually recognizable from the predetermined position while the flight device 3 flies to the candidate charging facility 4a, the decision unit 123 decides the candidate charging facility 4a as the charging facility 4 to be used for charging the battery by the flight device 3. Accordingly, for example, in a case where the flight device 3 is required to be visually recognizable at all times from an operator by regulations or the like, the information processing apparatus 1 can decide the charging facility 4 such that the flight device 3 is visually recognizable while flying to the charging facility 4.

In addition, in a case where a plurality of candidate charging facilities 4a are present within a predetermined range (for example, within a circle having a radius of 1 km), the decision unit 123 may select any candidate charging facility 4a based on the path on which the flight device 3 flies to the candidate charging facility 4a. In this case, for each of the plurality of candidate charging facilities 4a, the decision unit 123 specifies the straight linear path between the flight path and the candidate charging facility 4a or the path from the flight path to the candidate charging facility 4a obtained by simulation.

Among the plurality of candidate charging facilities 4a, the decision unit 123 decides a first candidate charging facility 4a for which a length of the specified path is a first value as the charging facility 4 to be used for charging the battery by the flight device 3, preferentially over a second candidate charging facility 4a for which the length of the specified path is a second value greater than the first value. Accordingly, in a case where the plurality of candidate charging facilities 4a are closely disposed, the information processing apparatus 1 can preferentially decide the charging facility 4 that can be reached by the flight device 3 on a shorter path.

Next, the processing of deciding the installation position by the decision unit 123 will be described. The decision unit 123, based on the candidate region information stored in advance in the storage unit 11, extracts the location (vacant land or the like) in which the charging facility 4 can be installed within the predetermined range (for example, within 1 km from the flight path) based on the flight path, as a candidate region A. For example, the candidate region A is designated by the range of coordinates or the address at which the charging facility 4 can be installed.

The decision unit 123 decides the installation position for newly installing the charging facility 4 from the candidate region A based on the intensity of the radio waves in at least one of the candidate region A and a region between the flight path and the candidate region A. Hereinafter, at least one of the candidate region A and the region between the flight path and the candidate region A will be referred to as a region related to the candidate region A.

For example, the decision unit 123 specifies the intensity in at least one of the candidate region A and the region between the flight path and the candidate region A from the radio wave information acquired by the radio wave information acquisition unit 122. The decision unit 123 may decide the installation position using the intensity in both of the candidate region A and the region between the flight path and the candidate region A, or may decide the installation position using the intensity in any one of the regions.

In a case where the specified intensity is greater than or equal to the predetermined reference value, the decision unit 123 decides the installation position for newly installing the charging facility 4 from the candidate region A. In a case where the specified intensity is less than the predetermined reference value, the decision unit 123 does not decide the installation position for newly installing the charging facility 4 from the candidate region A. Accordingly, the information processing apparatus 1 can decide the installation position of the charging facility 4 considering the intensity of the radio waves, and enable the flight device 3 to perform stable wireless communication in a case of flying to the charging facility 4.

Figure 5:
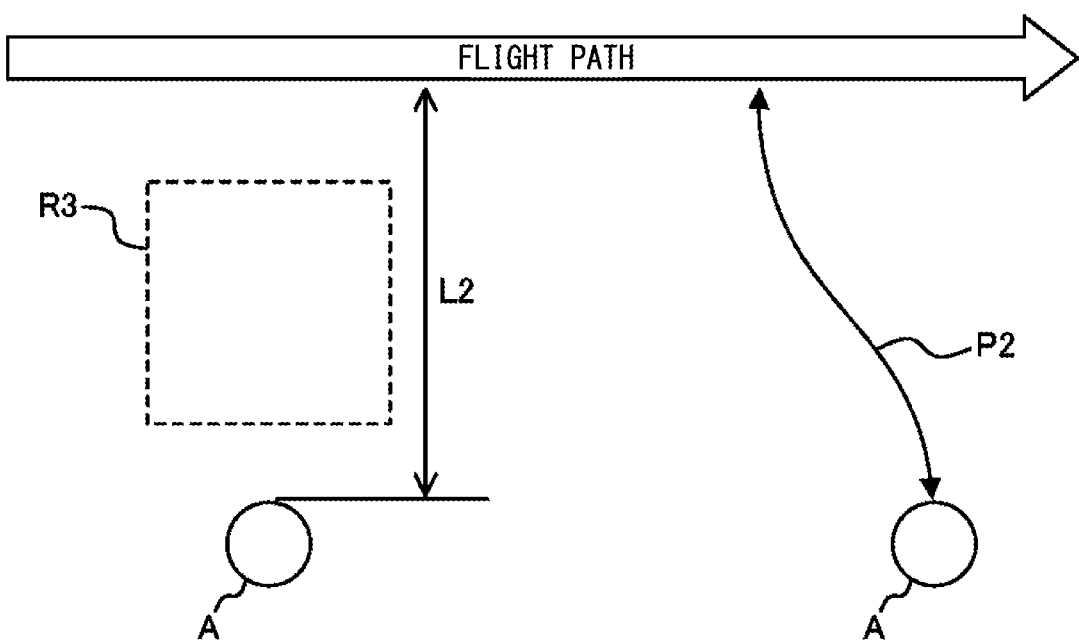
FIG. 5 is a schematic diagram for describing a method of deciding an installation position of the charging facility by the decision unit.

FIG. 5 is a schematic diagram for describing a method of deciding the installation position of the charging facility 4 by the decision unit 123. The candidate region A and a region R3 between the flight path and the candidate region A are represented in FIG. 5. The region R3 is, for example, a region including a straight linear (that is, the shortest distance) path from the flight path to the candidate region A. The decision unit 123 specifies the intensity in at least one of the candidate region A and the region R3 from the radio wave information acquired by the radio wave information acquisition unit 122. In a case where the intensity in at least one of the candidate region A and the region R3 is greater than or equal to the predetermined reference value, the decision unit 123 decides the installation position for newly installing the charging facility 4 from the candidate region A. The installation position may be the candidate region A itself or may be a position (for example, a center point) selected from the candidate region A.

In addition, the decision unit 123 may decide the installation position of the charging facility 4 based on the intensity in a path (path P2 in FIG. 5) on which the flight device 3 flies from the flight path to the candidate region A in the region between the flight path and the candidate region A. In this case, the decision unit 123 specifies the straight linear path between the flight path and the candidate region A or the path from the flight path to the candidate region A obtained by simulation. The decision unit 123 specifies the intensity on the specified path from the radio wave information acquired by the radio wave information acquisition unit 122.

In a case where the intensity in the path to a certain candidate region A is greater than or equal to the predetermined reference value, the decision unit 123 decides the installation position for newly installing the charging facility 4 from the candidate region A. Accordingly, the information processing apparatus 1 can suppress the event in which the flight device 3 cannot perform wireless communication while on the path for reaching the charging facility 4.

In addition to the intensity of the radio waves, the decision unit 123 may decide the installation position of the charging facility 4 based on at least one of a distance (distance L2 in FIG. 5) from the flight path to the candidate region A and the characteristics of the flight device 3. In this case, the decision unit 123 specifies the characteristics of the flight device 3 based on aircraft information about the flight device 3 stored in advance in the storage unit 11. The characteristics of the flight device 3 are the properties of the aircraft related to the flight of the flight device 3, such as the flight speed, the weight, and the battery capacity. The decision unit 123 calculates the upper limit distance based on the characteristics of the flight device 3. The upper limit distance is, for example, the reachable distance of the flight device 3 that is calculated based on the flight speed, the weight, the battery capacity, and the like.

In a case where the intensity of the radio waves in the region related to a certain candidate region A satisfies the predetermined radio wave condition, and the distance from the flight path to the candidate region A is less than or equal to the upper limit distance, the decision unit 123 decides the installation position for newly installing the charging facility 4 from the candidate region A. Accordingly, the information processing apparatus 1 can decide the installation position of the charging facility 4 within the reachable range of the flight device 3 after considering the intensity of the radio waves.

In addition to the intensity of the radio waves, the decision unit 123 may decide the installation position of the charging facility 4 based on an environment in at least one of the candidate region A and the region between the flight path and the candidate region A. In this case, the decision unit 123 specifies the environment in the region related to the candidate region A based on the environment information stored in advance in the storage unit 11. For example, the condition of the environment is such that the number or size of obstacles such as buildings satisfies the predetermined condition, the index indicating the degree of interference of the radio waves satisfies the predetermined condition, the attribute indicating that flying cannot be performed is not set on a land, or the land owner is a specific entity that satisfies the predetermined condition (public land or the like).

In a case where the intensity of the radio waves in the region related to a certain candidate region A satisfies the predetermined radio wave condition, and the environment in the region related to the candidate region A satisfies the predetermined condition, the decision unit 123 decides the installation position for newly installing the charging facility 4 from the candidate region A. Accordingly, the information processing apparatus 1 can decide the installation position of the charging facility 4 of which the surrounding environment satisfies the predetermined condition, after considering the intensity of the radio waves.

In addition to the intensity of the radio waves, the decision unit 123 may decide the installation position of the charging facility 4 on a condition that the flight device 3 is visually recognizable from a predetermined position while the flight device 3 flies to the candidate region A. In this case, the decision unit 123 specifies the straight linear path between the flight path and the candidate region A or the path from the flight path to the candidate region A obtained by simulation. The decision unit 123, by simulation, determines whether or not the specified path is visually recognizable from the predetermined position (for example, the base where the user operates the flight device 3).

In a case where the intensity of the radio waves in the region related to a certain candidate region A satisfies the predetermined radio wave condition, and it is determined that the flight device 3 is visually recognizable from the predetermined position while the flight device 3 flies to the candidate region A, the decision unit 123 decides the installation position for newly installing the charging facility 4 from the candidate region A. Accordingly, for example, in a case where the flight device 3 is required to be visually recognizable at all times from the operator by regulations or the like, the information processing apparatus 1 can decide the installation position of the charging facility 4 such that the flight device 3 is visually recognizable while flying to the charging facility 4.

In addition, in a case where a plurality of candidate regions A are present within a predetermined range (for example, within a circle having a radius of 1 kin), the decision unit 123 may select any candidate region A based on the path on which the flight device 3 flies to the candidate region A. In this case, for each of the plurality of candidate regions A, the decision unit 123 specifies the straight linear path between the flight path and the candidate region A or the path from the flight path to the candidate region A obtained by simulation.

Among the plurality of candidate regions A, the decision unit 123 decides a first candidate region A for which the length of the specified path is the first value as the installation position of the charging facility 4 to be used for charging the battery by the flight device 3, preferentially over a second candidate region A for which the length of the specified path is the second value greater than the first value. Accordingly, in a case where the plurality of candidate regions A are closely present, the information processing apparatus 1 can preferentially decide the installation position of the charging facility 4 that can be reached by the flight device 3 on a shorter path.

In addition, the decision unit 123 may execute the processing of deciding the charging facility 4 by the decision unit 123 and the processing of deciding the installation position by the decision unit 123 in combination. In this case, for example, in a case where the charging facility 4 cannot be decided based on the intensity of the radio waves in at least one of the region including the candidate charging facility 4*a* and the region between the flight path and the candidate charging facility 4*a*, the decision unit 123 decides the installation position for newly installing the charging facility 4 from the candidate region A based on the intensity of the radio waves in at least one of the candidate region A in which the charging facility 4 can be installed, and the region between the flight path and the candidate region A. Accordingly, in a case where the intensity of the radio waves in the region related to the existing charging facility 4 is not sufficient, the information processing apparatus 1 can suggest the installation position for newly installing the charging facility 4.

The notification unit 124 notifies the user terminal 2 of information that indicates the charging facility 4 or the installation position decided by the decision unit 123, in association with the flight path. The user terminal 2 displays the information, which is notified from the information processing apparatus 1, indicating the charging facility 4 or the installation position on the display unit in association with the flight path.

Figure 6A:
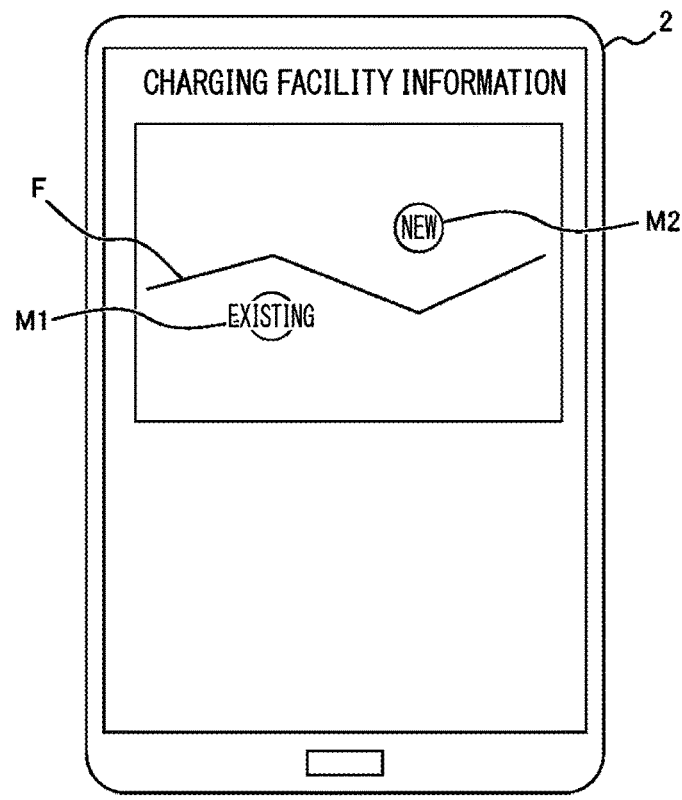
FIGS. 6A and 6B are front views of the user terminal that displays information.

FIG. 6A is a front view of the user terminal 2 that displays the information indicating the charging facility 4 or the installation position. The user terminal 2 displays a mark M1 indicating the charging facility 4 decided by the decision unit 123 and a mark M2 indicating the installation position decided by the decision unit 123 on a map including the flight path F. Accordingly, the user can be aware of the charging facility 4 or the installation position at which the intensity of the radio waves is sufficient, and can select the charging facility 4 to be used in a case where the flight device 3 flies, or newly install the charging facility 4 at the installation position.

Instead of or in addition to the information indicating the charging facility 4 or the installation position, the notification unit 124 may notify the user terminal 2 of a determination result (evaluation result) of the flight path in association with the flight path. In the processing of deciding the charging facility 4, for example, the determination result is information that indicates whether or not the intensity of the radio waves in at least one of the region including the candidate charging facility 4*a* and the region between the flight path and the candidate charging facility 4*a* satisfies a condition for deciding the candidate charging facility 4*a* as the charging facility 4.

In the processing of deciding the installation position, for example, the determination result is information that indicates whether or not the intensity of the radio waves in at least one of the candidate region A and the region between the flight path and the candidate region A satisfies a condition for deciding the installation position for newly installing the charging facility 4 from the candidate region A. The user terminal 2 displays the determination result notified from the information processing apparatus 1 on the display unit in association with the flight path.

Figure 6B:
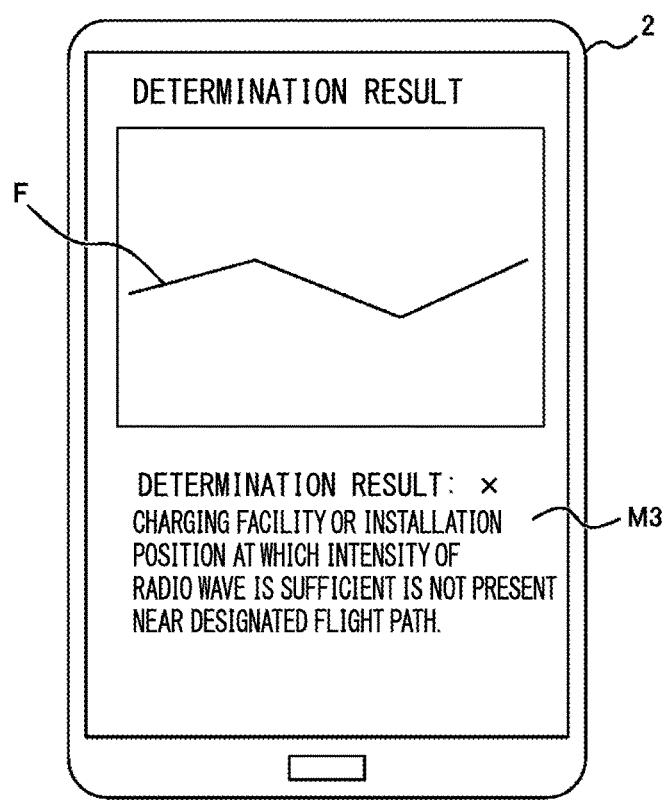

FIG. 6B is a front view of the user terminal 2 that displays the determination result. The user terminal 2 displays the map including the flight path F and a message M3 that indicates the determination result of the flight path F. Accordingly, the user can easily be aware of whether or not the charging facility 4 or the installation position at which the intensity of the radio waves is sufficient is present around the designated flight path, and can consider changing the flight path in a case where the charging facility 4 or the installation position at which the intensity of the radio waves is sufficient is not present.

In addition, in a case where the decision unit 123 cannot decide the charging facility 4 or the installation position, that is, in a case where the intensity of the radio waves in the region related to the charging facility 4 or the region related to the candidate region A does not satisfy the above radio wave condition, the notification unit 124 may notify the user terminal 2 of an alternative flight path different from the designated flight path. In this case, the decision unit 123 decides the alternative flight path that has a start point and an end point common to the designated flight path and of which a path at a certain point is different from the designated flight path, by executing known path decision processing.

The decision unit 123 decides the charging facility 4 or the installation position on the alternative flight path by executing at least one of the processing of deciding the charging facility 4 by the decision unit 123 and the processing of deciding the installation position by the decision unit 123 on the decided alternative flight path. In a case where the charging facility 4 or the installation position cannot be decided on the alternative flight path, the decision unit 123 may repeat the processing by further changing the alternative flight path.

In a case where the decision unit 123 decides the charging facility 4 or the installation position on the alternative flight path, the user terminal 2 is notified of the information indicating the decided charging facility or the installation position in association with the alternative flight path. Accordingly, even in a case where the charging facility 4 or the installation position at which the intensity of the radio waves is sufficient is not present around the designated flight path, the user can be aware of the alternative flight path decided by the information processing apparatus 1 and can cause the flight device 3 to fly along the alternative flight path.

In a case where the flight device 3 flies along the designated flight path after the notification unit 124 notifies the user terminal 2 of the information indicating the charging facility 4 or the installation position, the decision unit 123 may change the charging facility 4 or the installation position based on record information upon actual flight of the flight device 3. In this case, the flight information acquisition unit 121 acquires, from the flight device 3, the record information including at least one of a record time period taken upon the flight of the flight device 3 on the flight path and record intensity of the radio waves measured upon the flight of the flight device 3 on the flight path.

The decision unit 123, based on the record information, decides again the candidate charging facility 4a different from the already decided charging facility 4 as the charging facility 4 or decides again the installation position from the candidate region A different from the candidate region A to which the already decided installation position belongs. For example, in a case where the record time period indicated by the record information is longer than a predetermined reference time period, the decision unit 123 changes the charging facility 4 or the installation position. In addition, for example, in a case where the record intensity indicated by the record information is less than the predetermined reference value, the decision unit 123 changes the charging facility 4 or the installation position.

The notification unit 124 notifies the user terminal 2 of information that indicates the charging facility 4 or the installation position decided again. Accordingly, the information processing apparatus 1 can suggest a more appropriate charging facility 4 or an installation position so that the flight device 3 can fly to the charging facility 4 in a short time period, or the flight device 3 can receive the radio waves of sufficient intensity in a case of flying to the charging facility 4.

Sequence of Information Processing Method

FIG. 7 is a diagram illustrating a sequence of an information processing method executed by the information processing system. The user terminal 2 receives the input of the flight schedule information on the flight schedule screen (S11). Specifically, for example, the user terminal 2 receives the planar range (flight area) designated on the map displayed on the flight schedule screen as the flight range. In addition, the user terminal 2 receives the linear path designated in the flight range on the map displayed on the flight schedule screen as the flight path.

In the information processing apparatus 1, the flight information acquisition unit 121 acquires the flight schedule information including the flight path from the user terminal 2. The flight information acquisition unit 121 stores the flight schedule information received from the user terminal 2 in the storage unit 11.

The radio wave information acquisition unit 122 acquires the radio wave information, stored in advance in the storage unit 11, including the intensity of the radio waves used for communication by the flight device 3 within the predetermined range based on the flight path (S12). The decision unit 123 decides the charging facility 4 to be used for charging the battery by the flight device 3 or decides the installation position for newly installing the charging facility 4 based on the radio wave information (S13).

The notification unit 124 notifies the user terminal 2 of the information that indicates the charging facility 4 or the installation position decided by the decision unit 123, in association with the flight path (S14). Instead of or in addition to the information indicating the charging facility 4 or the installation position, the notification unit 124 may notify the user terminal 2 of the determination result (evaluation result) of the flight path in association with the flight path.

In a case where the flight device 3 flies along the designated flight path after the notification unit 124 notifies the user terminal 2 of the information indicating the charging facility 4 or the installation position, the flight device 3 transmits the record information including at least one of the record time period taken upon the flight of the flight device 3 on the flight path and the record intensity of the radio waves measured upon the flight of the flight device 3 on the flight path to the information processing apparatus 1 (S15). The flight information acquisition unit 121 acquires the record information from the flight device 3.

The decision unit 123, based on the record information, changes the charging facility 4 or the installation position by deciding again the candidate charging facility 4a different from the already decided charging facility 4 as the charging facility 4 or deciding again the installation position from the candidate region A different from the candidate region A to which the already decided installation position belongs (S16). The notification unit 124 notifies the user terminal 2 of the information that indicates the charging facility 4 or the installation position decided again (S17).

Effect of Embodiment

In a case where the communication situation deteriorates during the flight of the flight device 3 to the charging facility 4 for charging the battery, the flight device 3 cannot transmit and receive data related to the work such as monitoring or measurement to and from an outside, and the work during the flight of the flight device 3 may be delayed. Regarding this point, the information processing apparatus 1 according to the present embodiment decides the charging facility 4 to be used for charging the battery by the flight device 3 or decides the installation position for newly installing the charging facility 4 based on the intensity of the radio waves in the region related to the charging facility 4 or the region in which the charging facility 4 can be installed. Accordingly, the information processing apparatus 1 can enable the flight device 3 to perform stable wireless communication in a case of flying to the charging facility 4 and suppress occurrence of an adverse effect on the work of the flight device 3 during the flight due to deterioration of the communication situation.

Accordingly, for example, an environment in which the drone can fly can be created even in an urban area and a mountainous area covered by a wireless network. Thus, a contribution can be made to Goal 9 "Industry, Innovation and Infrastructure" and Goal 10 "Reduced Inequalities" of Sustainable Development Goals (SDGs) led by the United Nations.

While the present invention is described above using the embodiment, the technical scope of the present invention is not limited to the scope disclosed in the embodiment, and various modifications and changes can be made within the scope of the gist of the present invention. For example, all or part of the apparatus can be configured by functional or physical distribution or integration in any units. In addition, the embodiment of the present invention includes a new embodiment that results from any combination of a plurality of embodiments. An effect of the new embodiment resulting from the combination also has the effect of the original embodiment.

Processors of the information processing apparatus 1, the user terminal 2, and the flight device 3 are entities of each step (process) included in the information processing method illustrated in FIG. 7. That is, the processors of the information processing apparatus 1, the user terminal 2, and the flight device 3 execute the information processing method illustrated in FIG. 7 by reading a program for executing the information processing method illustrated in FIG. 7 from a storage unit and executing the program. A part of the steps included in the information processing method illustrated in FIG. 7 may be omitted. An order of the steps may be changed. A plurality of steps may be performed in parallel.

What is claimed is:

1. An information processing apparatus comprising:
a memory storing computer program instructions, and
at least one processor connected to the memory and configured to execute the computer program instructions to:
acquire a flight path on which a flight device operating by electric battery power supplied from a battery is scheduled to fly;
acquire radio wave information including an intensity of a radio wave used for communication by the flight device within a predetermined range based on the flight path; and
decide a candidate charging facility in which the battery is chargeable, as a charging facility to be used for charging the battery by the flight device based on a first intensity in at least one of a first region including the candidate charging facility or a second region between the flight path and the candidate charging facility; and
in a case where the charging facility cannot be decided based on the first intensity in the at least one of the first region or the second region, decide an installation position for newly installing an additional charging facility different from the charging facility within a third region in which the additional charging facility is installable, based on a second intensity in at least one of the third region or a fourth region between the flight path and the third region.

2. The information processing apparatus according to claim 1, wherein the at least one processor is configured to execute the computer program instructions to decide the charging facility based on the first intensity in a path on which the flight device flies from the flight path to the candidate charging facility.

3. The information processing apparatus according to claim 1, wherein the at least one processor is configured to execute the computer program instructions to decide the charging facility based on at least one of a distance from the flight path to the candidate charging facility or characteristics of the flight device, in addition to the first intensity.

4. The information processing apparatus according to claim 1, wherein the at least one processor is configured to execute the computer program instructions to decide the charging facility based on an environment in at least one of the first region or the second region, in addition to the first intensity.

5. The information processing apparatus according to claim 1, wherein the at least one processor is configured to execute the computer program instructions to decide the charging facility on a condition that the flight device is visually recognizable from a predetermined position while the flight device flies to the candidate charging facility, in addition to the first intensity.

6. The information processing apparatus according to claim 1, wherein the at least one processor is configured to execute the computer program instructions to decide a first candidate charging facility for which a length of a path on which the flight device flies to the candidate charging facility is a first value as the charging facility, preferentially over a second candidate charging facility for which the length is a second value greater than the first value, in addition to the first intensity.

7. The information processing apparatus according to claim 1, wherein the at least one processor is configured to execute the computer program instructions to:
acquire record information including at least one of a record time period taken upon flight of the flight device on the flight path or a record intensity of the radio wave measured upon the flight of the flight device on the flight path, and
decide the candidate charging facility different from the charging facility, as the additional charging facility based on the record information.

8. The information processing apparatus according to claim 1, wherein the at least one processor is configured to execute the computer program instructions to notify an information terminal associated with the flight device of a determination result as to whether or not the first intensity in the at least one of the first region or the second region satisfies a condition for deciding the candidate charging facility as the charging facility.

9. An information processing method executed by a processor, comprising:
- acquiring a flight path on which a flight device operating by electric battery power supplied from a battery is scheduled to fly;
- acquiring radio wave information including an intensity of a radio wave used for communication by the flight device within a predetermined range based on the flight path;
- deciding a candidate charging facility in which the battery is chargeable, as a charging facility to be used for charging the battery by the flight device based on a first intensity in at least one of a first region including the candidate charging facility or a second region between the flight path and the candidate charging facility; and
- in a case where the charging facility cannot be decided based on the first intensity in the at least one of the first region or the second region, deciding an installation position for newly installing an additional charging facility different from the charging facility within a third region in which the additional charging facility is installable, based on a second intensity in at least one of the third region or a fourth region between the flight path and the third region.

* * * * *